United States Patent [19]
Miyoshi et al.

[11] Patent Number: 5,770,661
[45] Date of Patent: Jun. 23, 1998

[54] POLYCARBODIIMIDE DERIVATIVE AND PROCESS FOR PRODUCING THE SAME

[75] Inventors: Hiroshi Miyoshi; Ken Yahata; Yasuyoshi Komoto; Yasuyuki Takiguchi; Akira Hayashida, all of Kawasaki, Japan

[73] Assignee: Shin-Etsu Chemical Co., Ltd., Tokyo, Japan

[21] Appl. No.: 785,170

[22] Filed: Jan. 13, 1997

[30] Foreign Application Priority Data

Jan. 16, 1996 [JP] Japan ................................. 8-004629
Jan. 19, 1996 [JP] Japan ................................. 8-006998

[51] Int. Cl.⁶ ............................................... C08G 18/82
[52] U.S. Cl. ........................... 525/452; 528/28; 528/44; 528/422; 528/489; 528/503; 264/29.1
[58] Field of Search ........................ 525/452; 528/503, 528/489, 422, 44, 28

[56] References Cited

U.S. PATENT DOCUMENTS

| 2,941,966 | 6/1960 | Campbell | 521/155 |
|---|---|---|---|
| 5,321,101 | 6/1994 | Suzuki | 525/452 |
| 5,357,021 | 10/1994 | Tye et al. | 528/28 |

FOREIGN PATENT DOCUMENTS

| 2579600 | 10/1986 | France . |
|---|---|---|
| 2225471 | 11/1994 | France . |
| 61-235414 | 10/1986 | Japan . |
| 61-268714 | 11/1986 | Japan . |
| 3247504 | 11/1991 | Japan . |
| 3247505 | 11/1991 | Japan . |
| 8333429 | 12/1996 | Japan . |
| 8333430 | 12/1996 | Japan . |

OTHER PUBLICATIONS

J. Org. Chem., 28 p. 2069 (1963) "High Polymers Containing the Carbodiimide Repeat Unit", Campbell & Smelz.

J. Org. Chem. 34 p. 3707 (1969); R.T. Markin & E.S. Canellakis; Alkylation by Alcohols in the Presence of Dicyclohexylcarbodiimide.

Angewandte Chemie International Edition, vol. 20, No. 10 Oct. 1981, pp. 819–830 Wagner et al, α, ω–Diisocyanatocarbodiimides, –Polycarbodiimides, and Their Derivatives.

*Primary Examiner*—Rachel Gorr
*Attorney, Agent, or Firm*—McAulay Fisher Nissen Goldberg & Kiel, LLP

[57] ABSTRACT

A polycarbodiimide compound is reacted with an organic compound having at least two amino groups in the molecule. A polycarbodiimide compound is reacted with an amine compound having a silicon atom in the molecule. The carbodiimide bonds remained in the crosslinked material are further crosslinked. The crosslinked material is further heated/calcined to obtain an inorganic material having high heat resistance and strong toughness.

8 Claims, No Drawings

POLYCARBODIIMIDE DERIVATIVE AND PROCESS FOR PRODUCING THE SAME

BACKGROUND OF THE INVENTION

The present invention relates to a process for crosslinking a polymer compound having a carbodiimide bond as a reactive functional group, which provides a high functional material by introducing various functional crosslinking agents and provides a polymer material having excellent heat resistance and mechanical characteristics. The present invention also provide an inorganic material having high heat resistance obtained by a high-temperature heat treatment.

The present invention also relate to a process for producing a polymer material having excellent heat resistance and mechanical characteristics, which is obtained by adding a specific compound to a polymer compound having a carbodiimide bond as a reactive functional group.

A lower-molecular weight carbodiimide (e.g. dicyclohexylcarbodiimide, diisopropylcarbodiimide, di-p-toluoylcarbodiimide, etc.) is a reagent having high reactivity used as a dehydration condensing reagent, and is utilized in the fields of ester synthesis, peptide synthesis and the like.

A polycarbodiimide having a plurality of carbodiimide bonds in the molecule is generally produced by decarboxylation condensation of a diisocyanate in a suitable solvent in the presence of a carbodiimidation catalyst.

It is disclosed that those obtained from an aromatic diisocyanate are particularly useful as a heat-resistant polymer [J. Org. Chem., 28, 2069 (1963), U.S. Pat. No. 2,941, 966].

When a crosslinked material is obtained from this polycarbodiimide compound and organic compound, it is possible to react the polycarbodiimide compound with an organic compound having a hydroxyl group (e.g. alcohols, etc.) to perform isourea type crosslinking by utilizing the high reactivity of a carbodiimide bond. However, it is also reported that the reaction conditions (e.g. excess reagent, high temperature, long time, etc.) are required for this reaction [J. Org. Chem., 34, 3707 (1969)]. The yield of this reaction was low, and it was difficult to completely react and control the reaction.

It has been said that a carbodiimide bond reacts with a compound having a hydroxyl group (e.g. alcohols, etc.) to form an isourea type adduct. However, it is disclosed in [J. Org. Chem., 34, 3707 (1969)] that the reaction conditions (e.g. excess reagent, high temperature, long time, etc.) are required for this reaction in spite of the high reactivity of the carbodiimide bond in the same manner as the above crosslinking. Therefore, the yield was low, and it was difficult to completely react and to control the reaction.

On the other hand, it is known that the carbodiimide bond reacts with a compound having an amine group (e.g. amines, etc.), easily and simply, to form a guanidine type adduct [Die Makromol. Chem., 67, 1 (1963)]. However, this is a process of adding a general hydrocarbon having one amino group to a polycarbodiimide compound, and addition of an organosilicon compound whose utility as a functional material is widely recognized is not known.

As disclosed in Japanese Patent Kokai Publication Nos. 3-247504 and 3-247505, it is known that heat-crosslinking of the polycarbodiimide compound results in a glassy carbon. A process of trimerizing the carbodiimide bond of a polycarbodiimide to crosslink the polycarbodiimide is disclosed in Japanese Patent Kokai Publication Nos. 61-235414 and 61-268714.

However, a technique of further crosslinking a polycarbodiimide derivative obtained by reacting a polycarbodiimide compound with an organosilicon having one amino group in the molecule, or converting the polycarbodiimide derivative into an inorganic material is not known.

SUMMARY OF THE INVENTION

One object of the present invention is to easily obtain a crosslinked material having various functions and mechanical characteristics by crosslinking a polymer compound having a plurality of carbodiimide bonds with an organic compound having at least two amino groups.

Another object of the present invention is to provide a novel material by further self-crosslinking the carbodiimide bonds remaining in the crosslinked material.

A further object of the present invention is to easily obtain a derivative having various functions and mechanical characteristics by using a polymer compound having a carbodiimide bond as a raw material. Still further, an object of the present invention is to obtain a novel material, which is superior in heat resistance and mechanical strength, by further heat-treating the derivative.

The present inventors have intensively experimented to obtain a crosslinked material of the above polycarbodiimide compound. As a result, it has been found that the desired crosslinked material can be obtained when a crosslinking reaction of the polycarbodiimide compound is performed using an organic compound having at least two amino groups. Thus, the present invention has been made. In the first group of the embodiments in accordance with the present invention, the polycarbodiimide compound is reacted with the organic compound having at least two amino groups in the molecule in a polycarbodiimide crosslinked material and a process for producing the same.

The present inventors have intensively experimented to obtain a derivative of the above polycarbodiimide compound. As a result, it has been found that the use of an amine compound having a silicon atom in the molecule is useful for rapidly proceeding with an addition reaction of the polycarbodiimide compound to obtain a crosslinked material. Thus, the present invention has been made. In the second group of the embodiments in accordance with the present invention, the polycarbodiimide compound is reacted with an amine compound, having a silicon atom in the molecule, in a process for producing a polycarbodiimide derivative.

According to the first group of the embodiments of the present invention, a crosslinked material of a polycarbodiimide compound can be easily obtained by reacting the polycarbodiimide compound with an organic compound having at least two amino groups in the molecule.

Since the degree of crosslinking can be optionally controlled only by controlling an amount of the organic compound having at least two amino groups in the molecule added, a molecular weight of the desired crosslinked material of the polycarbodiimide compound can be easily controlled.

According to the present invention, it is possible to easily introduce various functional groups into a polymer by utilizing a reactivity between the carbodiimide bond and organic compound having at least two amino groups in the molecule. Therefore, the present invention can be widely applied to the production of high-functional materials such as semiconductor sealing material, high-density optical recording material and the like.

According to the second group of embodiments of the present invention, a derivative of a polycarbodiimide compound can be easily obtained by reacting the polycarbodiimide compound with an amine compound having a silicon atom in the molecule.

Since the proportion of guanidine bonds to carbodiimide bonds can be optionally controlled only by controlling an amount of the amine compound having a silicon atom in the molecule added, a polymer having suitable number of guanidine bonds and carbodiimide bonds can be easily obtained.

Furthermore, it is possible to easily introduce a compound having various functional characteristics (e.g. rubber elasticity, optical properties, etc.) into a polymer by utilizing the reactivity between the carbodiimide bond and an organic compound having a silicon atom in the molecule. Therefore, the present invention can be widely applied to the production of high-functional materials such as semiconductor sealing material, high-density optical recording material and the like.

Furthermore, according to the first and second groups of the embodiments of the present invention, it is possible to obtain a novel functional material, which is superior in mechanical strength and thermal properties, by further crosslinking the carbodiimide bonds that remain in the adduct. These novel functional materials can be used in the fields of heat-resistant insulating materials, liquid crystal oriented materials and the like.

Furthermore, it is possible to obtain an inorganic material having high heat resistance and strong toughness by heating/calcinating the above functional material. These inorganic materials can be used in the fields of hard disc substrates, battery/electrode materials and the like.

A heat-crosslinked material in accordance with the present invention, which is obtained by heating a polycarbodiimide crosslinked material having a guanidine bond and a carbodiimide bond, to promote self-crosslinking of the carbodiimide bond, can be used for applications such as heat-resistant insulating materials, liquid crystal oriented materials and the like.

A crosslinked material in accordance with the present invention, which is obtained by adding a basic substance for promoting trimerization of a carbodiimide bond to a polycarbodiimide crosslinked material having a guanidine bond and a carbodiimide bond, and reacting the basic substance with the polycarbodiimide crosslinked material to further promote self-crosslinking of the carbodiimide bond, can be used for applications such as heat-resistant insulating material, liquid crystal oriented materials and the like.

An inorganic material in accordance with the present invention, which is obtained by further heat-treating a heat-crosslinked material at 500°–3000°C. to convert it into the inorganic material, said heat-crosslinked material being obtained by heating a polycarbodiimide crosslinked material having a guanidine bond and a carbodiimide bond to further promote self-crosslinking of the carbodiimide bond, can be used for applications such as hard disc substrates, battery/electrode materials and the like.

An inorganic material in accordance with the present invention, which is obtained by further heat-treating a heat-crosslinked material at 500°–3000° C. to convert it into the inorganic material, said heat-crosslinked material being obtained by adding a basic substance for promoting trimerization of a carbodiimide bond to a polycarbodiimide crosslinked material having a guanidine bond and a carbodiimide bond to further promote self-crosslinking of the carbodiimide bond, can be used for applications such as hard disc substrates, battery/electrode materials and the like.

PREFERRED EMBODIMENTS OF THE INVENTION

In the first and second groups of the embodiments, in accordance with the present invention, the polycarbodiimide is synthesized, for example, by one of the following processes.

Synthesis process (No. 1)

The polycarbodiimide is normally produced by heating an organic diisocyanate in a hydrocarbon solvent (e.g. toluene, xylene, decahydronaphthalene, etc.), followed by decarboxylation condensation. However, a deleterious influence is exerted on the following crosslinking reaction of a compound having at least two amino groups because an insoluble crosslinking product is formed.

Therefore, the present inventors employed a process of controlling the reaction temperature, the reaction time, etc. to adjust a molecular weight as a process of Japanese Patent Application No. 7-14044.

This process is a process of heating an organic diisocyanate in the presence of a carbodiimidation catalyst to synthesize a polycarbodiimide, i.e. process of producing a solution of the formed polycarbodiimide having a number-average molecular weight of 3,000 or more to less than 10,000, more preferably 6,000 or more to less than 10,000, using a chlorine-free aromatic hydrocarbon as a solvent. A concentration of the organic diisocyanate is from 1 to 20 w/v %, preferably from 5 to 15 w/v %, based on the solvent, and the catalyst is added in an amount of 0.05 to 0.20% by mol, based on this organic diisocyanate. In this process, the reaction temperature is adjusted within the range from 100° to 120° C., preferably 110° to 120° C., so as to make it easy to adjust the molecular weight. The number-average molecular weight of the polycarbodiimide can be controlled within the range from 3,000 or more to less than 10,000 by heating at this temperature for 2–4 hours.

Synthesis process (No. 2)

According to processes of using a halogenated aliphatic hydrocarbon solvent (e.g. tetrachloroethylene, etc.) and an alicyclic ether solvent (e.g. tetrahydrofuran, etc.), which are disclosed in Japanese Patent Kokai Nos. 2-292316 and 4-279618, a solution of a stable polycarbodiimide is obtained. The polycarbodiimide thus obtained is preferred as a starting material in the present invention.

An object of these processes is to obtain a polycarbodiimide solution from an organic diisocyanate by using a halogenated aliphatic hydrocarbon solvent (e.g. tetrachloroethylene, etc) and an alicyclic ether solvent (e.g. tetrahydrofuran, etc.) as a solvent in the presence of a carbodiimidation catalyst.

Synthesis process (No. 3)

It is also possible to use a polycarbodiimide obtained by the process using a halogenated aromatic hydrocarbon solvent and an aromatic carboxylate solvent, which was suggested by the present inventors in Japanese Patent Application No. 7-140145 (Patent applied for), as a starting substance for the same reason.

Examples of the organic diisocyanate, used as the starting substance in the above process, include hexamethylene diisocyanate, phenylene diisocyanate, tolylene diisocyanate, methylenebis(4-phenylisocyanate), naphthylene diisocyanate and the like.

Other synthesis processes

In the present invention, the starting substance is not specifically limited to the polycarbodiimide produced by the above production process, and it is possible to use any compound having a plurality of carbodiimide bonds in a solution state, obtained by the other process, as the starting substance.

The polycarbodiimide which can be generally used is a polycarbodiimide having at least two carbodiimide bonds in the molecule, preferably carbodiimide having at least five carbodiimide bonds in the molecule, more preferably carbodiimide having a molecular weight of not less than 5,000, so as to impart general characteristics of the polymer.

In the first group of the embodiments of the present invention, as the organic compound having at least two amino groups preferably two to four amino groups, a compound having an amino group at both ends is preferably represented by the formula (1):

(1)

wherein $R^1$ and $R^2$ respectively indicate hydrogen or an organic group preferably a C1–20 organic group such as aliphatic organic groups or aromatic organic groups and the like. Specific examples of the organic group include aliphatic organic groups such as methyl group, ethyl group and the like; and aromatic organic groups such as phenyl group, benzyl group and the like. R is a divalent organic group and preferably have a structure represented by the formula (2), (3) or (4):

(2)

wherein $R^3$ is hydrogen or an organic group preferably a C1–20 organic group. Specific examples of the organic group include aliphatic organic groups such as methyl group, ethyl group, phenyl group, benzyl group and the like.

k is an integer of not less than 1, preferably $1 \leq k \leq 100$ and more preferably 1–50.

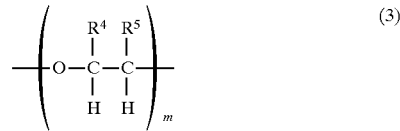
(3)

wherein $R^4$ and $R^5$ respectively indicate hydrogen or an organic group preferably a C1–20 organic group. Specific examples of the organic group include aliphatic organic groups such as methyl group, ethyl group, phenyl group, benzyl group and the like.

m is an integer of not less than 1, preferably $1 \leq m \leq 100$, more preferably $1 \leq m \leq 50$.

(4)

wherein $R^6$ and $R^7$ respectively indicate hydrogen or an organic group preferably a C1–20 organic group. Specific examples of the organic group include aliphatic organic groups such as methyl group, ethyl group and the like; aromatic organic groups such as phenyl group, benzyl group and the like; and methoxy group, ethoxy group and benzoyl group.

n is an integer of not less than 1, preferably $1 \leq n \leq 100$ more preferably $1 \leq n \leq 50$.

Specific examples of the organic compound having at least two amino groups include polyvalent amines having an aliphatic carbon chain in the molecule, such as 1,3-diaminopropane, 1,7-diaminoheptane, 1,10-diaminodecane and the like; polyvalent amines having an oxyethylene chain in the molecule, such as ethylene glycol bis(3-aminopropyl) ether, poly(oxyethylene)-dipropylamine and the like; and polyvalent amines having a siloxane chain in the molecule, such as poly(dimethylsiloxane)-dipropoxylamine and the like.

When the polycarbodiimide is crosslinked with the organic compound having at least two amino groups, a crosslinking form due to a guanidine type bond is formed. It is possible to add the organic compound having at least two amino groups to such an extent that problems do not arise during the molding process. That is, when molding is performed in a solution state, the organic compound can be added to the extent that a gel or precipitate is not formed. When molding is performed in a powder state, the organic compound can be added to the extent that melt viscosity is not too high. Namely, it means the amount where one amino group among two amino groups in the molecule can quantitatively react with a carbodiimide bond in the polycarbodiimide compound. Accordingly, an equivalent ratio of the amino group to the carbodiimide in the polycarbodiimide compound can take any value of not more than 1.0 preferably 0.001 to 0.5. In order to finally obtain a crosslinked material as a material having excellent characteristics, it is necessary that the equivalent ratio of the amino group to the carbodiimide in the polycarbodiimide compound is not less than 0.001. It is also possible to easily control a proportion of the guanidine bond to the carbodiimide bond used in the crosslinking to any proportion by controlling the amount of the organic compound having at least two amino groups to be added.

Crosslinking of polycarbodiimide

When the polycarbodiimide is crosslinked with the organic compound having at least two amino groups, the organic compound having at least two amino groups may be added in the state of being dissolved in the solvent or a similar solvent after the polycarbodiimide was obtained. The crosslinking reaction is performed in a short time even at about room temperature, and the organic compound having at least two amino groups added reacts in an approximately stoichiometric manner.

Another embodiment with respect to crosslinking

Accordingly, the carbodiimide bonds that remained without reacting can also be utilized for various reactions. In this case, various organic compounds having at least two amino groups in the molecule can also be used.

In the second group of the embodiments of the present invention, the amine compound having a silicon atom in the molecule is represented by the following general formula (5):

(5)

wherein $R^8$ is an organic group having a silicon atom, and $R^9$ is hydrogen or a C1–6 (C1–6 means that the number of carbon atoms is from one to six in the specification.) hydrocarbon radical. $R^8$ is preferably represented by any one of the following formulas (6), (7), (8) and (9).

(6)

wherein $R^{10}$ and $R^{11}$ respectively indicate a C1–20 (C1–20 means that the number of carbon atoms is from one to twenty in the specification.) organic group, and p is an integer of not less than 1, preferably $1 \leq p \leq 100$ more preferably $1 \leq p \leq 50$.

wherein $R^{12}$ and $R^{13}$ respectively indicate a C1–20 organic group, and q is an integer of not less than 1, preferably $1 \leq q \leq 100$ more preferably $1 \leq q \leq 50$.

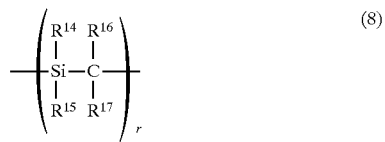

wherein $R^{14}$ and $R^{15}$ respectively indicate a C1–20 organic group, $R^{16}$ and $R^{17}$ respectively indicates hydrogen or a C1–20 organic group, and r is an integer of not less than 1, preferably $1 \leq r \leq 100$ more preferably $1 \leq r \leq 50$.

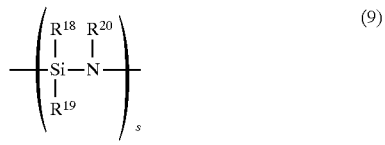

wherein $R^{18}$ and $R^{19}$ respectively indicate a C1–20 organic group, $R^{20}$ is hydrogen or a C1–20 organic group, and s is an integer of not less than 1, preferably $1 \leq s \leq 100$, more preferably $1 \leq s \leq 50$.

When an amine compound containing a silicon atom in the molecule is added to a polycarbodiimide, a polycarbodiimide may be dissolved in a suitable solvent such as chlorobenzene or tetrachloroethylene and an amine compound containing a silicon atom in the molecule may be added thereto as such or as a solution in a similar solvent. The addition reaction may be completed in a short period of time even at about room temperature and the amine compound containing a silicon atom in the molecule added reacts approximately stoichiometrically.

Amine compounds containing a silicon atom in the molecule include, for example, amines containing a Si-O chain in the molecule such as 3-aminopropyltriethoxysilane, 3-aminopropyltrimethoxysilane and 3-aminopropyldiethoxymethylsilane; amines containing a Si-Si chain in the molecule such as 3-aminopropyl-2,2,2-triethoxydimethyldisilane, 3-aminopropyl-2,2,2-trimethoxydimethyldisilane and 3-aminoethyl-2,2,2-triethoxydimethyldisilane; amines containing a Si-C chain in the molecule such as 3-aminopropyltriethylsilane, 3-aminopropyltrimethylsilane and 3-aminopropyldimethylethoxysilane; and amines containing a Si-N chain in the molecule such as bis(ethylamino)dimethylsilane, bis(ethylamino)diethylsilane and bis(ethylamino)ethylmethylsilane.

When an amine compound containing a silicon atom is added to a polycarbodiimide, the amine compound can be added to all carbodiimide linkages to form a guanidine linkage.

The amount of the amine compound containing a silicon atom added can be such that no problem may be caused upon forming operations. Thus, if the forming operation is conducted in a solution state, the amount may be such that no gel or precipitate is deposited. The amount may be such that a polymer melts and the melt viscosity is not too high if a powder is subjected to the forming operation. Thus, any equivalent ratio of the amine compound to the carbodiimide linkage in the polycarbodiimide compound in the range of 1.0 or less preferably 0.1 to 1.0 can be used which is such an amount that at least the amine groups can stoichiometrically react with the carbodiimide linkages in the polycarbodiimide compound.

In order to obtain a cross-linked product as a material having resulting excellent properties, said equivalent ratio of the amine to the carbodiimide linkage in the polycarbodiimide compound should be 0.001 or higher.

It is also possible to easily control a proportion of the guanidine bonds to the carbodiimide bonds to any necessary proportion by controlling the amount of the amine compound having a silicon atom. Accordingly, the carbodiimide bonds that remain without reacting can also be utilized for the following various reactions.

Various amine compounds having a silicon atom can be easily introduced.

In the present invention, a polymer material having increasingly excellent mechanical strength and heat resistance can be obtained by crosslinking the carbodiimide bonds remaining without being subjected to the crosslinking reaction due to heating or trimerizing.

Crosslinking due to heating

The present invention includes the process the carbodiimide bonds that remained are heated to cause self-crosslinking, thereby obtaining a crosslinked material.

That is, a heat-crosslinked material, which is obtained by heating a polycarbodiimide crosslinked material having a guanidine bond and a carbodiimide bond obtained by reacting the polycarbodiimide compound with the organic compound having at least two amino groups in the molecule (crosslinked material of the first group of the embodiments of the present invention), or a polycarbodiimide crosslinked material having a guanidine bond and a carbodiimide bond obtained by reacting the polycarbodiimide compound with the amine compound having a silicon atom in the molecule (crosslinked material of the second group of the embodiments of the present invention), to promote self-crosslinking of the carbodiimide bond and a process for producing the same are also included in the present invention.

When a polymer having a carbodiimide bond is heated, it may be heated at the temperature within the range from 50° to 300° C., preferably from 100° to 260° C. If the temperature is 50° C. or less, crosslinking reaction will not be expected. If the temperature is 300° C. or higher, elimination of an organic group may happen to affect the strength of a product. In this case, it is preferred to heat under vacuum or in a non-oxidizing atomosphere of nitrogen, argon, etc. If the temperature is not more than 300° C., it can also be heated in air. The preferred heating time is from about 1 to 30 minutes.

Crosslinking due to trimerization

In the present invention, a crosslinked material can also be obtained by adding a basic substance for promoting trimerization of a carbodiimide bond to a polycarbodiimide crosslinked material having a guanidine bond and a carbodiimide bond obtained by reacting the polycarbodiimide compound with the organic compound having at least two amino groups in the molecule (crosslinked material of the first group of the embodiments of the present invention), or a polycarbodiimide crosslinked material having a guanidine bond and a carbodiimide bond obtained by reacting the polycarbodiimide compound with the amine compound having a silicon atom in the molecule (crosslinked material of the second group of the embodiments of the present invention), and reacting the basic substance with the polycarbodiimide crosslinked material to further promote self-crosslinking of the carbodiimide bond.

That is, crosslinking of the carbodiimide bond due to a catalyst can also be performed by the trimerization reaction due to the addition of the basic substance such as 1,5-diazabicyclo[4. 3. 0]nonene, 1,4-diazabicyclo[2. 2. 2]octane, 1,8-diazabicyclo[5. 4. 0]undecene and the like. The basic substance may be added to the extent that the crosslinking rate causes no problem during molding process, and thus added in amounts within the range of from 0.1 to 10% by mol, based on the carbodiimide bond. The reaction temperature may be room temperature (−10° to 30° C.). In order to react in a shorter time, it is effective to heat to not more than 200° C., more preferably not more than 100° C. The heating time is preferably about 1 minute to 2 hours.

It is possible to obtain a polymer material (crosslinked material), which is superior in mechanical strength and heat resistance, by crosslinking these carbodiimide bonds.

Production of high heat-resistant inorganic material

In the present invention, a high heat-resistant inorganic material can be obtained by subjecting the crosslinked material, thus obtained as described above, to a heat treatment at about 500°–3000° C., which is used in the production so-called glassy carbon, under vacuum or a non-oxidizing atmosphere of nitrogen, argon, etc. In this case, according to the first group of the embodiments of the present invention, it becomes possible to produce a novel high heat-resistant inorganic material having various properties by selecting the kind and amount of a compound having at least two amino groups. In the second group of the embodiments of the present invention, it becomes possible to produce a novel high heat-resistant inorganic material having various properties by selecting the kind and amount of a compound having a hydroxyl group and a mercapto group to be added.

That is, according to the present invention, an inorganic material can be produced by heat-treating a heat-crosslinked material at 500°–3000° C. for about 30 minutes to 6 hours to convert it into the inorganic material, said heat-crosslinked material being obtained by heating a carbodiimide crosslinked material having a guanidine bond and a carbodiimide bond obtained by reacting a polycarbodiimide compound with an organic compound having at least two amino groups in the molecule (crosslinked material of the first group of the embodiments of the present invention), or a polycarbodiimide crosslinked material having a guanidine bond and a carbodiimide bond obtained by reacting the polycarbodiimide compound with the amine compound having a silicon atom in the molecule (crosslinked material of the second group of the embodiments of the present invention) to further promote self-crosslinking of the carbodiimide bond.

Also, according to the present invention, an inorganic material can be produced by heat-treating a heat-crosslinked material at 500°–3000° C. for about 30 minutes to 6 hours to convert it into the inorganic material, said heat-crosslinked material being obtained by adding a basic substance for promoting trimerization of a carbodiimide bond to a polycarbodiimide crosslinked material having a guanidine bond and a carbodiimide bond obtained by reacting a polycarbodiimide compound with an organic compound having at least two amino groups in the molecule (crosslinked material of the first group of the embodiments of the present invention), or a polycarbodiimide crosslinked material having a guanidine bond and a carbodiimide bond obtained by reacting the polycarbodiimide compound with the amine compound having a silicon atom in the molecule (crosslinked material of the second group of the embodiments of the present invention), and reacting the basic substance with the polycarbodiimide crosslinked material to further promote self-crosslinking of the carbodiimide bond.

WORKING EXAMPLES

The present invention will be further specifically described using the following examples.

Synthesis Example 1

Synthesis of raw polycarbodiimide

To commercially available 2,4-tolylene diisocyanate (16.2 g), phenyl isocyanate (270 mg) and 3-methyl-1-phenyl-3-phosphorene-1-oxide (36.0 mg) was added chlorobenzene (150 ml) as a reaction solvent, and the mixture was heated with stirring under a nitrogen atmosphere at 120° C. for 3 hours to obtain a polycarbodiimide.

Example 1

Reaction between polycarbodiimide and 1,3-diaminopropane

To a solution prepared by dissolving the polycarbodiimide (0.205 g, carbodiimide bond: 1.55 mmol) obtained in Synthesis Example 1 in chlorobenzene (2.5 ml), a solution prepared by dissolving 1,3-diaminopropane (22.9 mg, amino group: 20% by mol based on carbodiimide bond) in chlorobenzene (2.5 ml) was added. The resulting white precipitate was filtered, washed and air-dried, and then the solvent was removed by vacuum drying to obtain a crosslinked material.

The IR spectrum of disks was measured. As a result, a new absorption derived from a guanidine type bond appeared at 3410 $cm^{-1}$ and, further, an absorption at 1629 $cm^{-1}$ increased and proceeding of a guanidine type reaction was confirmed. A novel absorption derived from C-H of a methylene chain was also observed at 2929 $cm^{-1}$.

The reaction between a polycarbodiimide compound and an organic compound having at least two amino groups in the molecule was confirmed by these results, which showed that the present invention is effective.

Example 2

Reaction between polycarbodiimide and 1,3-diaminopropane

To a solution prepared by dissolving the polycarbodiimide (0.205 g, carbodiimide bond: 1.55 mmol) obtained in Synthesis Example 1 in chlorobenzene (2.5 ml), a solution prepared by dissolving 1,3-diaminopropane (4.6 mg, amino group: 4% by mol based on carbodiimide bond) in chlorobenzene (2.5 ml) was added. The resulting white precipitate was filtered, washed and air-dried, and then the solvent was removed by vacuum drying to obtain a crosslinked material.

The IR spectrum of disks was measured. As a result, a new absorption derived from a guanidine type bond appeared at 3410 $cm^{-1}$ and, further, an absorption at 1629 $cm^{-1}$ increased and proceeding of a guanidine type reaction could be confirmed. A novel absorption derived from C-H of a methylene chain was also observed at 2929 $cm^{-1}$.

These results showed an effectiveness of the present invention in the same manner as Example 1.

Example 3

Reaction between polycarbodiimide and 1,10-diaminodecane

To a solution prepared by dissolving the polycarbodiimide (0.205 g, carbodiimide bond: 1.55 mmol) obtained in Synthesis Example 1 in chlorobenzene (2.5 ml), a solution prepared by dissolving 1,10-diaminodecane (53.7 mg, amino group: 20% by mol based on carbodiimide bond) in chlorobenzene (2.5 ml) was added. The resulting white precipitate was filtered, washed and air-dried, and then the solvent was removed by vacuum drying to obtain a crosslinked material.

The IR spectrum of disks was measured. As a result, a new absorption derived from a guanidine type bond appeared at 3406 cm$^{-1}$ and, further, an absorption at 1635 cm$^{-1}$ increased and proceeding of a guanidine type reaction could be confirmed. A novel absorption derived from C-H of a methylene chain was also observed at 2928 cm$^{-1}$.

These results showed an effectiveness of the present invention in the same manner as Example 1.

Example 4
Reaction between polycarbodiimide and 1,10-diaminodecane

To a solution prepared by dissolving the polycarbodiimide (0.205 g, carbodiimide bond: 1.55 mmol) obtained in Synthesis Example 1 in chlorobenzene (2.5 ml), a solution prepared by dissolving 1,10-diaminodecane (10.7 mg, amino group: 4% by mol based on carbodiimide bond) in chlorobenzene (2.5 ml) was added. The resulting white precipitate was filtered, washed and air-dried, and then the solvent was removed by vacuum drying to obtain a crosslinked material.

The IR spectrum of disks was measured. As a result, a new absorption derived from a guanidine type bond appeared at 3406 cm$^{-1}$ and, further, an absorption at 1635 cm$^{-1}$ increased and proceeding of a guanidine type reaction could be confirmed. A novel absorption derived from C-H of a methylene chain was also observed at 2928 cm$^{-1}$.

These results showed an effectiveness of the present invention in the same manner as Example 1.

Example 5
Reaction between polycarbodiimide and poly(oxyethylene)-dipropylamine

To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(oxyethylene)-dipropylamine (average molecular weight: 10,000) (0.47 g, amino group: 2% by mol based on carbodiimide bond) in tetrahydrofuran (22.5 ml) was added, followed by stirring at room temperature for 1 hour.

The IR spectrum of the reaction solution was measured. As a result, a new absorption derived from a guanidine type bond appeared at 3569 cm$^{-1}$ and, further, an absorption at 1686 and 1467 cm$^{-1}$ increased and the proceeding of a guanidine type reaction could be confirmed. A novel absorption derived from C-H of a methylene chain was also observed at 2887 cm$^{-1}$.

The molecular weight of the reaction solution was measured by gel permeation chromatography (hereinafter referred to as "GPC"). As a result, an increase in molecular weight from Mn (9620, Mw/Mn=1.91) to Mn (26523, Mw/Mn=2.21) was observed (Mn: number-average molecular weight, Mw: weight-average molecular weight.

These results showed the effectiveness of the present invention according to the same manner as that described in Example 1.

Example 6
Reaction between polycarbodiimide and poly(oxyethylene)-dipropylamine

To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(oxyethylene)-dipropylamine (average molecular weight: 10,000) (0.235 g, amino group: 1% by mol based on carbodiimide bond) in tetrahydrofuran (22.5 ml) was added, followed by stirring at room temperature for 1 hour.

The IR spectrum of the reaction solution was measured. As a result, a new absorption derived from a guanidine type bond appeared at 3569 cm$^{-1}$ and, further, an absorption at 1686 and 1467 cm$^{-1}$ increased and the proceeding of a guanidine type reaction could be confirmed. A novel absorption derived from C-H of a methylene chain was also observed at 2887 cm$^{-1}$.

The molecular weight of the reaction solution was measured by GPC. As a result, an increase in molecular weight from Mn (9620, Mw/Mn=1.91) to Mn (18735, Mw/Mn=2.42) was observed).

These results showed the effectiveness of the present invention according to the same manner as that described in Example 1.

Example 7
Reaction between polycarbodiimide and poly (dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 840) (39 mg, amino group: 2% by mol based on carbodiimide bond) in chlorobenzene (22.5 ml) was added, followed by stirring at room temperature for 1 hour.

The molecular weight of the reaction solution was measured by GPC. As a result, an increase in molecular weight from Mn (5830, Mw/Mn=2.21) to Mn (9792, Mw/Mn=2.23) was observed.

These results showed the effectiveness of the present invention according to the same manner as that described in Example 1.

Example 8
Reaction between polycarbodiimide and poly (dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 840) (19.5 mg, amino group: 1% by mol based on carbodiimide bond) in chlorobenzene (22.5 ml) was added, followed by stirring at room temperature for 1 hour.

The molecular weight of the reaction solution was measured by GPC. As a result, an increase in molecular weight from Mn (5830, Mw/Mn=2.21) to Mn (7987, Mw/Mn=2.08) was observed.

These results showed an effectiveness of the present invention according to the same manner as that described in Example 1.

Example 9
Reaction between polycarbodiimide and poly (dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 4,700) (218 mg, amino group: 2% by mol based on carbodiimide bond) in chlorobenzene (22.5 ml) was added, followed by stirring at room temperature for 1 hour.

The IR spectrum of the reaction solution was measured. As a result, a new absorption derived from C-H of a dimethylsiloxane chain was observed at 2963 cm$^{-1}$ and a new absorption derived from Si-C was observed at 1262 and 804 cm$^{-1}$ and, further, new absorption derived from O-Si-O was observed at 1094 and 1023 cm$^{-1}$, respectively.

The molecular weight of the reaction solution was measured by GPC. As a result, an increase in molecular weight from Mn (5830, Mw/Mn=2.21) to Mn (14512, Mw/Mn=2.62) was observed.

These results showed an effectiveness of the present invention according to the same manner as that described in Example 1.

Example 10
Reaction between polycarbodiimide and poly(dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 4,700) (109 mg, amino group: 1% by mol based on carbodiimide bond) in chlorobenzene (22.5 ml) was added, followed by stirring at room temperature for 1 hour.

The IR spectrum of the reaction solution was measured. As a result, a new absorption derived from C-H of a dimethylsiloxane chain was observed at 2963 cm$^{-1}$ and a new absorption derived from Si-C was observed at 1263 and 806 cm$^{-1}$ and, further, new absorption derived from O-Si-O was observed at 1095 and 1024 cm$^{-1}$, respectively.

The molecular weight of the reaction solution was measured by GPC. As a result, an increase in molecular weight from Mn (5830, Mw/Mn=2.21) to Mn (9576, Mw/Mn=2.26) was observed.

These results showed the effectiveness of the present invention according to the same manner as that described in Example 1.

Example 11
Reaction between polycarbodiimide and poly(dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 12,100) (562 mg, amino group: 2% by mol based on carbodiimide bond) in chlorobenzene (22.5 ml) was added, followed by stirring at room temperature for 1 hour.

The IR spectrum of the reaction solution was measured. As a result, a new absorption derived from C-H of a dimethylsiloxane chain was observed at 2963 cm$^{-1}$ and a new absorption derived from Si-C was observed at 1262 and 803 cm$^{-1}$ and, further, new absorption derived from O-Si-O was observed at 1094 and 1023 cm$^{-1}$, respectively.

The molecular weight of the reaction solution was measured by GPC. As a result, an increase in molecular weight from Mn (5830, Mw/Mn=2.21) to Mn (18645, Mw/Mn 3.52) was observed.

These results showed the effectiveness of the present invention according to the same manner as that described in Example 1.

Example 12
Reaction between polycarbodiimide and poly(dimethylsiloxane)-dipropylamine To a solution prepared by dissolving the polycarbodiimide (0.615 g, carbodiimide bond: 4.65 mmol) obtained in Synthesis Example 1 in chlorobenzene (7.5 ml), a solution prepared by dissolving poly(dimethylsiloxane)-dipropylamine (average molecular weight: 12,100) (281 mg, amino group: 2% by mol based on carbodiimide bond) in chlorobenzene (22.5 ml) was added, followed by stirring at room temperature for 1 hour.

The IR spectrum of the reaction solution was measured. As a result, new absorption derived from C-H of a dimethylsiloxane chain was observed at 2963 cm$^{-1}$ and a new absorption derived from Si-C was observed at 1262 and 803 cm$^{-1}$ and, further, new absorption derived from O-Si-O was observed at 1094 and 1023 cm$^{-1}$, respectively.

The molecular weight of the reaction solution was measured by GPC. As a result, an increase in molecular weight from Mn (5830, Mw/Mn=2.21) to Mn (10417, Mw/Mn=2.73) was observed.

These results showed the effectiveness of the present invention according to the same manner as that described in Example 1.

Example 13
Heat-crosslinking of polycarbodiimide crosslinked material having crosslinking form of guanidine type bond A solution of the polycarbodiimide crosslinked material obtained by the process of Example 9 in chlorobenzene was casted on a glass plate. The solvent was removed by air drying and further vacuum drying to obtain a polycarbodiimide crosslinked film. This film was heat-treated under vacuum at 165° and 185° C. for 5 minutes to obtain a film having a thickness of 110 μm.

A tensile strength of the resulting film was measured. As a result, the tensile strength of the non-treated film was 150 kgf/cm$^2$ and those of the films heat-treated at 165° and 185° C. were 300 and 400 kgf/cm$^2$, respectively. The strength was improved by crosslinking due to a heat treatment, while the flexibility was also maintained.

Example 14
Crosslinking of polycarbodiimide crosslinked material having crosslinking form of guanidine type bond due to addition of basic substance To a solution of the polycarbodiimide crosslinked material obtained by the process of Example 4 in chlorobenzene was added 1,8-diazabicyclo[5. 4. 0]undecene in an amount of 1% by mol based on the carbodiimide bond, and the mixture was casted on a glass plate. This glass plate was air-dried, vacuum-dried and then heated at 80° C. for 1 hour to obtain a film having a thickness of 105 μm, wherein a polymer having an isourea bond and a carbodiimide bond had been crosslinked by a trimerization reaction of the carbodiimide bond.

A tensile strength of the resulting film was measured. As a result, the tensile strength of the non-treated film was 150 kgf/cm$^2$ and that of the film crosslinked by adding a basic substance was 500 kgf/cm$^2$, respectively. The strength was remarkably improved by crosslinking, while the flexibility was also maintained.

Example 15
Conversion of crosslinked polymer into inorganic material

The heat-crosslinked film of the polycarbodiimide crosslinked material having the crosslinking form of the guanidine type bond, which was obtained by the heat treatment at 185° C. according to the process of Example 13, was heated under vacuum at 250° C. for 5 hours. The film was heated stepwise from 250° to 300° C. over 15 minutes, from 300° to 500° C. over 60 minutes and from 500° to 1000° C. over 90 minutes, respectively, and then maintained finally at 1000° C. for 30 minutes to obtain an inorganic film having a thickness of 80 μm.

The surface of this inorganic film was observed by SEM. As a result, the surface was extremely flat and substantially devoid of defects (e.g. foam etc.). The tensile strength was 800 kgf/cm$^2$ and the resulting film was an inorganic film having strong toughness.

Example 16
Reaction between polycarbodiimide and 3-aminopropyltriethoxysilane To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropyltriethoxysilane (1.03 g, amino group: 100% by mol based on carbodiimide bond) in chlorobenzene (15 ml) was added, followed by stirring at room temperature for 1 hour.

The IR spectrum of the reaction solution was measured. As a result, an absorption at 2140 cm$^{-1}$ derived from a carbodiimide bond nearly disappeared and a new absorption derived from a guanidine type bond appeared at 3395 cm$^{-1}$. Furthermore, the absorption at 1636 cm$^{-1}$ increased and, therefore, the proceeding of a guanidine type reaction could be confirmed.

These results showed the presence of a reaction between a polycarbodiimide compound and an amine compound having a silicon atom in the molecule.

Example 17
Reaction between polycarbodiimide and 3-aminopropyltriethoxysilane To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropyltriethoxysilane (0.515 g, amino group: 50% by mol based on carbodiimide bond) in chlorobenzene (15 ml) was added, followed by stirring at room temperature for 1 hour.

The IR spectrum of the reaction solution was measured. As a result, an absorption at 2138 cm$^{-1}$ derived from a carbodiimide bond nearly decreased and a new absorption derived from a guanidine type bond appeared at 3398 cm$^{-1}$. Furthermore, the absorption at 1636 cm$^{-1}$ increased and, therefore, the proceeding of a guanidine type reaction could be confirmed.

Example 18
Reaction between polycarbodiimide and 3-aminopropyltriethoxysilane To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropyltriethoxysilane (0.103 g, amino group: 10% by mol based on carbodiimide bond) in chlorobenzene (15 ml) was added, followed by stirring at room temperature for 1 hour.

The IR spectrum of the reaction solution was measured. As a result, a new absorption derived from a guanidine type bond appeared at 3400 cm$^{-1}$ in addition to an absorption derived from a carbodiimide at 2140 cm$^{-1}$. Furthermore, the absorption at 1637 cm$^{-1}$ increased and, therefore, the proceeding of a guanidine type reaction could be confirmed.

Example 19
Reaction between polycarbodiimide and 3-aminopropyl-2,2,2-triethoxydimethyldisilane To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropyl-2,2,2-triethoxydimethyldisilane (0.865 g, amino group: 100% by mol based on carbodiimide bond) in chlorobenzene (15 ml) was added, followed by stirring at room temperature for 1 hour.

The IR spectrum of the reaction solution was measured. As a result, an absorption at 2140 cm$^{-1}$ derived from a carbodiimide bond nearly decreased and a new absorption derived from a guanidine type bond appeared at 3395 cm$^{-1}$. Furthermore, the absorption at 1636 cm$^{-1}$ increased and, therefore, the proceeding of a guanidine type reaction could be confirmed.

Example 20
Reaction between polycarbodiimide and 3-aminopropyltriethylsilane To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropyltriethylsilane (0.499 g, amino group: 100% by mol based on carbodiimide bond) in chlorobenzene (15 ml) was added, followed by stirring at room temperature for 1 hour.

The IR spectrum of the reaction solution was measured. As a result, an absorption at 2140 cm$^{-1}$ derived from a carbodiimide bond nearly decreased and a new absorption derived from a guanidine type bond appeared at 3395 cm$^{-1}$. Furthermore, the absorption at 1636 cm$^{-1}$ increased and, therefore, the proceeding of a guanidine type reaction could be confirmed.

Example 21
Reaction between polycarbodiimide and 3-aminopropylsiloxane

To a solution prepared by dissolving the polycarbodiimide (0.41 g, carbodiimide bond: 3.1 mmol) obtained in Synthesis Example 1 in chlorobenzene (5 ml), a solution prepared by dissolving 3-aminopropylsiloxane having an average composition formula represented by the general formula:

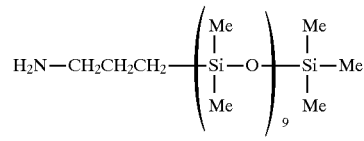

(2.47 g, amino group: 100% by mol based on carbodiimide bond) in chlorobenzene (15 ml) was added, followed by stirring at room temperature for 1 hour.

The IR spectrum of the reaction solution was measured. As a result, an absorption at 2140 cm$^{-1}$ derived from a carbodiimide bond nearly decreased and a new absorption derived from a guanidine type bond appeared at 3395 cm$^{-1}$. Furthermore, the absorption at 1636 cm$^{-1}$ increased and, therefore, the proceeding of a guanidine type reaction could be confirmed.

Example 22
Heat-crosslinking of polymer having guanidine bond and carbodiimide bond A solution of the polycarbodiimide derivative obtained by the process of Example 18 in chlorobenzene was casted on a glass plate. The solvent was removed by air drying and further vacuum drying to obtain a polycarbodiimide crosslinked film. This film was heat-treated under vacuum at 185° C. for 5 minutes to obtain a film having a thickness of 48 μm.

A tensile strength of the resulting film was measured. As a result, the tensile strength of the non-treated film was 24 kgf/cm$^2$ and that of the heat-treated film was 280 kgf/cm$^2$, respectively. The strength was remarkably improved by crosslinking due to a heat treatment.

Example 23

Crosslinking of polymer having guanidine bond and carbodiimide bond due to addition of basic substance To a solution of the polycarbodiimide derivative obtained by the process of Example 18 in chlorobenzene was added 1,8-diazabicyclo[5. 4. 0]undecene in an amount of 1% by mol based on the carbodiimide bond and the mixture was casted on a glass plate. This glass plate was air-dried, vacuum-dried and then heated at 80° C. for 1 hour to obtain a film having a thickness of 52 μm, wherein a polymer having an isourea bond and a carbodiimide bond has been crosslinked by a trimerization reaction of the carbodiimide bond.

A tensile strength of the resulting film was measured. As a result, the tensile strength of the non-treated film was 24 kgf/cm$^2$ and that of the film crosslinked by adding a basic substance was 220 kgf/cm$^2$, respectively. The strength was remarkably improved by crosslinking.

Example 24

Conversion of crosslinked polymer into inorganic material

The heat-crosslinked film having the guanidine bond and carbodiimide bond, which was obtained by the process of Example 21, was heated under vacuum at 250° C. for 5 hours. The film was heated stepwise from 250° to 300° C. over 15 minutes, from 300° to 500° C. over 60 minutes and from 500° to 1000° C. over 90 minutes, respectively, and then maintained finally at 1000° C. for 30 minutes to obtain an inorganic film having a thickness of 80 μm.

The surface of this inorganic film was observed by SEM. As a result, the surface was extremely flat and defects (e.g. foam etc.) were hardly observed. The tensile strength was 750 kgf/cm$^2$ and the resulting film was an inorganic film having strong toughness.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polycarbodiimide derivative, which is obtained by reacting a polycarbodiimide compound with an amine compound having a silicon atom in the molecule.

2. A process for producing a polycarbodiimide derivative, which comprises reacting a polycarbodiimide compound with an amine compound having a silicon atom in the molecule.

3. A heat-crosslinked material, which is obtained by heating a polycarbodiimide crosslinked material having a guanidine bond and a carbodiimide bond obtained by reacting a polycarbodiimide compound with an organic compound having at least two amino groups in the molecule, or by heating a polycarbodiimide derivative having a guanidine bond and a carbodiimide obtained by reacting a polycarbodiimide compound with an amine compound having a silicon atom in the molecule to further promote self-crosslinking of the carbodiimide bond.

4. A process for producing a heat-crosslinked material, which comprises heating a polycarbodiimide crosslinked material having a guanidine bond and a carbodiimide bond obtained by reacting a polycarbodiimide compound with an organic compound having at least two amino groups in the molecule, or heating a polycarbodiimide derivative having a guanidine bond and a carbodiimide bond obtained by reacting a polycarbodiimide compound with an amine compound having a silicon atom in the molecule to further promote self-crosslinking of the carbodiimide bond.

5. A crosslinked material, which is obtained by adding a basic substance for promoting trimerization of a carbodiimide bond to a polycarbodiimide crosslinked material having a guanidine bond and a carbodiimide bond obtained by reacting a polycarbodiimide compound with an organic compound having at least two amino groups in the molecule, or to a polycarbodiimide derivative having a guanidine bond and a carbodiimide bond obtained by reacting a polycarbodiimide compound with an amine compound having a silicon atom in the molecule, and reacting the basic substance with the polycarbodiimide crosslinked material to further promote self-crosslinking of the carbodiimide bond.

6. A process for producing a crosslinked material, which comprises adding a basic substance for promoting trimerization of a carbodiimide bond to a polycarbodiimide crosslinked material having a guanidine bond and a carbodiimide bond obtained by reacting a polycarbodiimide compound with an organic compound having at least two amino groups in the molecule, or to a polycarbodiimide derivative having a guanidine bond and a carbodiimide bond obtained by reacting a polycarbodiimide compound with an amine compound having a silicon atom in the molecule, and reacting the basic substance with the polycarbodiimide crosslinked material to further promote self-crosslinking of the carbodiimide bond.

7. A process for producing an inorganic material, which comprises further heat-treating a heat-crosslinked material at 500°–3000° C. to convert it into the inorganic material, said heat-crosslinked material being obtained by heating a polycarbodiimide crosslinked material having a guanidine bond and a carbodiimide bond obtained by reacting a polycarbodiimide compound with an organic compound having at least two amino groups in the molecule or being obtained by heating a polycarbodiimide derivative having a guanidine bond and a carbodiimide bond obtained by reacting a polycarbodiimide compound with an amine compound having a silicon atom in the molecule to further promote self-crosslinking of the carbodiimide bond.

8. A process for producing an inorganic material, which comprises further heat-treating a crosslinked material at 500°–3000° C. to convert it into the inorganic material, said crosslinked material being obtained by adding a basic substance for promoting trimerization of a carbodiimide bond to a polycarbodiimide crosslinked material having a guanidine bond and a carbodiimide bond obtained by reacting a polycarbodiimide compound with an organic compound having at least two amino groups in the molecule or to a polycarbodiimide derivative having a guanidine bond and a carbodiimide bond obtained by reacting a polycarbodiimide compound with an amine compound having a silicon atom in the molecule, and reacting the basic substance with the polycarbodiimide crosslinked material to further promote self-crosslinking of the carbodiimide bond.

* * * * *